(12) United States Patent
Park et al.

(10) Patent No.: US 8,811,609 B2
(45) Date of Patent: Aug. 19, 2014

(54) INFORMATION PROTECTION SYSTEM AND METHOD

(75) Inventors: Sang-Hyun Park, Daejeon (KR); Jun-Ho Lee, Seoul (KR); Haeng-Seok Ko, Daejeon (KR); Myung-Won Seo, Daejeon (KR); In-Jung Kim, Daejeon (KR); Jang-Hong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/397,306

(22) Filed: Feb. 15, 2012

(65) Prior Publication Data

US 2013/0031365 A1 Jan. 31, 2013

(30) Foreign Application Priority Data

Jul. 28, 2011 (KR) .......................... 10-2011-0075313

(51) Int. Cl.
*G06F 21/00* (2013.01)

(52) U.S. Cl.
USPC .................................. 380/43; 380/44; 726/24

(58) Field of Classification Search
None
See application file for complete search history.

(56) References Cited

U.S. PATENT DOCUMENTS

| 2001/0008015 A1* | 7/2001 | Vu et al. .......................... 713/189 |
| 2007/0288752 A1* | 12/2007 | Chan ................................ 713/171 |
| 2008/0279381 A1* | 11/2008 | Narendra et al. ............. 380/270 |
| 2009/0044260 A1* | 2/2009 | Niglio et al. ....................... 726/9 |
| 2010/0030695 A1* | 2/2010 | Chen et al. ....................... 705/67 |
| 2010/0199334 A1 | 8/2010 | Ehrensvard et al. |

FOREIGN PATENT DOCUMENTS

| JP | 2005-192110 A | 7/2005 |
| JP | 2009-534768 A | 9/2009 |
| KR | 10-2005-0010992 A | 1/2005 |
| KR | 10-2009-0024860 A | 3/2009 |
| KR | 10-2011-0041612 A | 4/2011 |

* cited by examiner

*Primary Examiner* — Izunna Okeke
(74) *Attorney, Agent, or Firm* — LRK Patent Law Firm

(57) ABSTRACT

An information protection system includes a mobile terminal and an encryption module. The mobile terminal requests a key sequence by transmitting a message including a Personal Identification Number (PIN) number input by a user, and encrypts or decrypts one or more communication signals, including voice signals and data signals, based on the key sequence when the key sequence is received. The encryption module is connected to the mobile terminal. The encryption module encrypts a security key using the identifier and the PIN number of the mobile terminal, decrypts the encrypted security when requested by the mobile terminal, and transmits the key sequence generated based on the decrypted security key to the mobile terminal.

6 Claims, 5 Drawing Sheets

| MESSAGE | FUNCTION EXPLANATION |
|---|---|
| C_Req_Dev_ID | REQUEST IDENTIFIER OF TERMINAL |
| C_Res_Dev_ID | RESPOND IDENTIFIER OF TERMINAL |
| C_Req_Login | REQUEST LOG-IN |
| C_Res_Login | RESPOND LOG-IN |
| C_Set_PIN | REQUEST PIN NUMBER SETTING |
| C_Res_PIN | RESPOND PIN NUMBER SETTING |
| C_Req_Key | REQUEST KEY SEQUENCE |
| C_Res_Key | RESPOND KEY SEQUENCE |
| C_Req_Get_Info | REQUEST STATUS OF ENCRYPTION MODULE |
| C_Res_Info | RESPOND STATUS OF ENCRYPTION MODULE |

INFORMATION PROTECTION SYSTEM AND METHOD

CROSS REFERENCE TO RELATED APPLICATION

This application claims the benefit of Korean Patent Application No. 10-2011-0075313, filed on Jul. 28, 2011, which is hereby incorporated by reference in its entirety into this application.

BACKGROUND OF THE INVENTION

1. Technical Field

The present invention relates generally to an information protection system and method, and, more particularly, to an information protection system and method which provides an encryption module, which decrypts an encrypted and stored security key and transmits a key sequence generated based on the decrypted security key, to a mobile terminal in order to perform end-to-end secure communication without modifying the internal communication module of the mobile terminal, so that all communication signals which are transmitted and received are encrypted or decrypted, thereby preventing wiretapping and sniffing.

2. Description of the Related Art

Recently, with in explosive increase in the demand for mobile terminals, including smart phones and tablet Personal Computers (PCs), security for mobile terminals has become an issue. In particular, people in the army, government and business as well as the general public who handle secrets cannot perform communication using mobile terminals with peace of mind because of the problems of the wiretapping of communication or the divulging of personal information.

In order to solve the above-described problem, various types of encryption modules have been proposed. An encryption module which is connected to the car phone terminal of a mobile phone terminal is a representative module. Such encryption module receives input voice using a microphone provided to an apparatus, encrypts a received voice signal using an internal Digital Signal Processor (DSP) processor, and then transmits the encrypted voice signal to other party using a mobile phone terminal. Further, the encryption module decrypts the encrypted voice signal received from the other party using the internal DSP processor and then transmits the decrypted voice signal using the ear phone.

When encryption is performed using the above-described method, secure communication can be performed without modifying the communication module of a mobile phone terminal. However, such an encryption module should be provided with a DSP processor, a battery, and a codec, so that there are the problems in that the costs for implementing the encryption module increase, and in that secure communication cannot be performed on data signals.

Meanwhile, with the popularization of a mobile Voice over IP (mVoIP) service using a mobile terminal such as a smart phone, the percentage of voice traffic has decreased and the percentage of data traffic has increased among communication traffic. Mobile Internet phones have been made using a technique for packetizing voice into Internet Protocol (IP) data, and transmitting the resulting data using a real-time transport protocol. Since the voice communication cost using mVoIP is remarkably inexpensive compared to the existing voice communication costs, mVoIP has replaced voice communication markets. Therefore, it is required to provide an encrypted communication function for data rather than the encryption of voice itself in order to realize secure communication in the future.

SUMMARY OF THE INVENTION

Accordingly, the present invention has been made keeping in mind the above problems occurring in the prior art, and an object of the present invention is to provide an information protection system and method, which provides an encryption module, which decrypts an encrypted and stored security key and transmits a key sequence generated based on the decrypted security key, to a mobile terminal in order to perform end-to-end secure communication without modifying the internal communication module of the mobile terminal, so that all communication signals which are transmitted and received are encrypted or decrypted.

In order to accomplish the above object, the present invention provides an information protection system, including a mobile terminal for requesting a key sequence by transmitting a message including a Personal Identification Number (PIN) number input by a user, and encrypting or decrypting one or more communication signals, including voice signals and data signals, based on the key sequence when the key sequence is received; and an encryption module connected to the mobile terminal, for encrypting a security key using the PIN number and an identifier of the mobile terminal, decrypting the encrypted security key when requested by the mobile terminal, and transmitting the key sequence generated based on the decrypted security key to the mobile terminal.

The encryption module may receive the identifier from the mobile terminal, and authenticates the mobile terminal by applying the identifier of the mobile terminal to a Message Authentication Code (MAC) technique.

The encryption module may determine whether to decrypt the encrypted security key by determining whether the PIN number of the message received from the mobile terminal is identical to a previously stored PIN number.

When the PIN number of the message received from the mobile terminal is not identical to the previously stored PIN number, the encryption module may increase a PIN number error count, and then terminates a communication performed with the mobile terminal based on the result of comparison of the PIN number error count and an error reference value.

The encryption module may include a security key encryption unit for performing the operation of encrypting the security key using the PIN number and the identifier of the mobile terminal when the encryption module initially accesses the mobile terminal; a security key decryption unit for decrypting the encrypted security key when requested by the mobile terminal; a key sequence generation unit for generating the key sequence by applying the decrypted security key to a preset algorithm; a module control unit for encrypting the security key by controlling the security key encryption unit, and transmitting the encrypted security key to the key sequence generation unit for generating the key sequence; a driving information storage unit for storing all programs related to the driving of the encryption module; and a security information storage unit for storing the encrypted security key, and the PIN number and the identifier of the mobile terminal.

In order to accomplish the above object, the present invention provides an information protection method, including: determining whether to connect a mobile terminal which encrypts or decrypts one or more communication signals including voice signals and data signals; authenticating whether the mobile terminal is a normal terminal using an identifier of the mobile terminal, when the mobile terminal is connected; determining whether a received PIN number is identical to a previously stored PIN number when the authenticated mobile terminal requests a key sequence by transmitting the PIN number input by a user; performing an operation of decrypting a previously encrypted and stored security key when the PIN numbers are identical to each other; and generating the key sequence based on the decrypted security key, and transmitting the key sequence to the mobile terminal such that the communication signals can be encrypted or decrypted.

The determining whether the received PIN number is identical to the previously stored PIN number may includes, increasing a PIN number error count when the PIN numbers are not identical to each other, and determining whether to terminate communication with the mobile terminal by determining whether the PIN number error count is equal to or greater than an error reference value.

The authenticating the mobile terminal may include authenticating the mobile terminal by applying the identifier of the mobile terminal to a Message Authentication Code (MAC) technique; terminating communication with the mobile terminal when the mobile terminal is not a normal terminal; and transmitting a notification message that the mobile terminal has been successfully authenticated to the mobile terminal when the mobile terminal is a normal terminal.

In order to accomplish the above object, the present invention provides an information protection method including executing a secure communication program in order to encrypt or decrypt one or more communication signals, including voice signals and data signals, which are transmitted and received to and from a mobile terminal; requesting a key sequence which is applied to the secure communication program by transmitting a PIN number, input by a user, to an encryption module; and encrypting or decrypting the communication signals by applying the key sequence to the secure communication program, when the encryption module decrypts a previously encrypted and stored security key based on a result of comparison of the received PIN number and a previously stored PIN number, and then generates and transmits the key sequence.

The executing the secure communication program may include, transmitting the identifier of the mobile terminal to the encryption module when the encryption module requests an identifier of the mobile terminal; and receiving a notification message that the mobile terminal has been successfully authenticated from the encryption module, when the mobile terminal is a normal terminal, as a result of authentication performed by the encryption module using the identifier of the mobile terminal.

BRIEF DESCRIPTION OF THE DRAWINGS

The above and other objects, features and advantages of the present invention will be more clearly understood from the following detailed description taken in conjunction with the accompanying drawings, in which:

FIG. 5 is a view illustrating an example of a message transmitted and received by the information protection system of FIG. 1 in order to perform secure communication.

DESCRIPTION OF THE PREFERRED EMBODIMENTS

Figure 1:
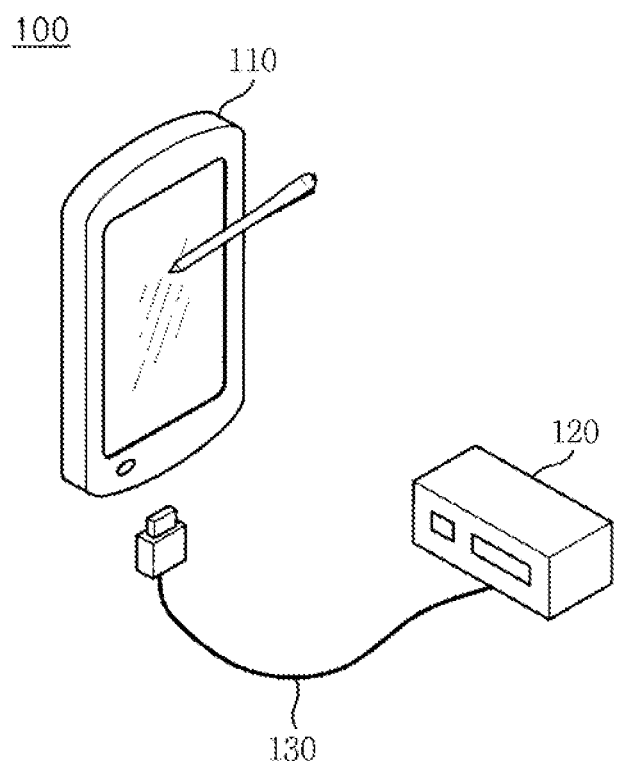
FIG. 1 is a view schematically illustrating an information protection system according to an embodiment of the present invention.

The present invention will be described in detail below with reference to the accompanying drawings. Here, in cases where the description would be repetitive and detailed descriptions of well-known functions or configurations would unnecessarily obscure the gist of the present invention, the detailed descriptions will be omitted. The embodiments of the present invention are provided to complete the explanation of the present invention to those skilled in the art. Therefore, the shapes and sizes of components in the drawings may be exaggerated to provide a more exact description.

Figure 2:
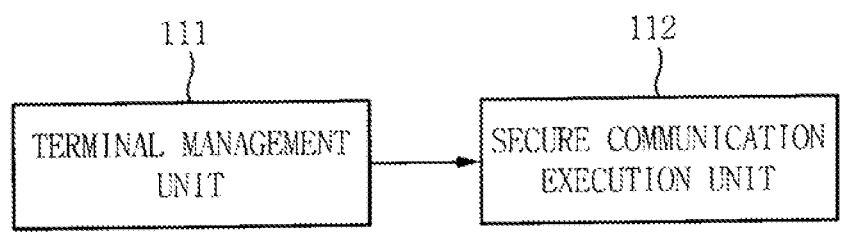
FIG. 2 is a view schematically illustrating the mobile terminal of the information protection system of FIG. 1.
Figure 3:
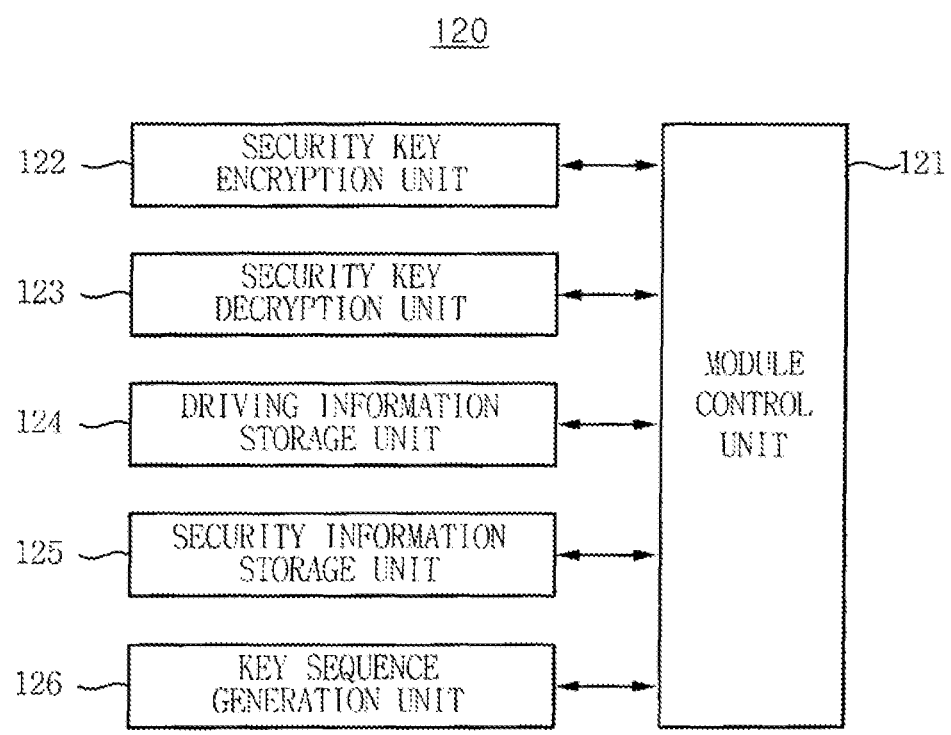
FIG. 3 is a view schematically illustrating the encryption module of the information protection system of FIG. 1.

FIG. 1 is a view schematically illustrating an information protection system according to an embodiment of the present invention. FIG. 2 is a view schematically illustrating the mobile terminal of the information protection system of FIG. 1. FIG. 3 is a view schematically illustrating the encryption module of the information protection system of FIG. 1.

As shown in FIG. 1, an information protection system 100 according to an embodiment of the present invention includes a mobile terminal 110, an encryption module 120 and an interface module 130.

The mobile terminal 110 stores an encryption/decryption application program (hereinafter referred to as a "secure communication program") which is used to perform secure communication by encrypting or decrypting all communication signals which are transmitted and received, and executes the secure communication program at the request of a user. Such a communication signal according to the embodiment of the present invention includes voice signals obtained by processing voice and also data signals obtained by processing data. Here, data signals may be obtained in such a way that, for example, text data or Voice over Internet Protocol (VoIP) data is processed as signals.

When the secure communication program is executed and then a user inputs a preset Personal Identification Number (PIN) number, the mobile terminal 110 requests a key sequence which is necessary to perform encryption or decryption (hereinafter, encryption or decryption will be used with "secure communication") by transmitting the input PIN number to the encryption module 120 using the interface module 130. Here, the PIN number is a personal identification number which can be used to identify the user of the mobile terminal 110.

When the PIN number is identified and a key sequence is received from the encryption module 120, the mobile terminal 110 encrypts or decrypts a communication signal by applying the key sequence to the secure communication program. That is, the mobile terminal 110 transmits the results of secure communication which were encrypted or decrypted by performing an exclusive OR on the key sequence and the communication signal.

Based on the above-described method, when a user uses a VoIP service program, for example, skype, the mobile terminal 110 may perform secure communication by encrypting transmitted and received voice. Further, when a user uses commercial text service program. such as "Kakao Talk", the mobile terminal 110 may perform secure communication by encrypting transmitted and received text.

As described above, when an encryption module is provided to a mobile apparatus and then secure communication is performed according to the present invention, all communication signals which are used by the mobile apparatus may be safely encrypted and decrypted and then transmitted and received.

The mobile terminal 110 includes a terminal management unit 111 and a secure communication execution unit 112, as shown in FIG. 2.

The terminal management unit 111 previously stores the secure communication program in order to encrypt or decrypt all the communication signals which are transmitted and received. Thereafter, when a user inputs a PIN number in order to request a key sequence which is necessary to perform secure communication, the terminal management unit 111 requests the key sequence by transmitting the input PIN number to the encryption module 120 using the interface module 130. When the key sequence is received from the encryption module 120, the terminal management unit 111 transmits the key sequence to the secure communication execution unit 112.

The secure communication execution unit 112 executes the secure communication program and encrypts or decrypts all the communication signals, which are transmitted or received, using the key sequence.

Referring to FIG. 1 again, the encryption module 120 decrypts an encoded and stored security key based on the results of comparison of the PIN number received using the interface module 130 and previously stored PIN number, generates a key sequence, and then transmits the key sequence to the mobile terminal 110.

The encryption module 120 includes a module control unit 121, a security key encryption unit 122, a security key decryption unit 123, a driving information storage unit 124, a security information storage unit 125 and a key sequence generation unit 126, as shown in FIG. 3.

The module control unit 121 controls the communication between the secure communication program and the encryption module based on predetermined messages, and controls the internal blocks 122, 123, 124, 125, and 126 of the encryption module, thereby enabling secure communication to be performed. Further, the module control unit 121 controls the security key encryption unit 122 such that a security key is encrypted in order to prepare for the case where the security key is missed. When the mobile terminal 110 requests a key sequence, the module control unit 121 controls the security key decryption unit 122 such that the encrypted security key is decrypted. Further, the module control unit 121 transmits a decrypted security key to the key sequence generation unit 126 for generating the key sequence.

When the encryption module 120 initially accesses the mobile terminal 110, the security key encryption unit 122 receives the identifier and PIN number of the mobile terminal 110 in order to prepare for the case where the security key is missed, performs an operation of previously encrypting the security key using the identifier and PIN number of the mobile terminal 110, and then stores the encrypted security key in the security key storage unit 122.

The security key decryption unit 123 performs an operation of encrypting the encrypted security key under the control of the module control unit 121. Thereafter, the security key decryption unit 123 transmits the decrypted security key to the module control unit 121.

The driving information storage unit 124 stores all programs which are necessary to drive the encryption module 120, for example, a program used to boot up.

The security information storage unit 125 stores all pieces of information generated between the encryption module 120 and the mobile terminal 110 when secure communication is performed. In detail, the security information storage unit 125 stores the security key encrypted by the security key encryption unit 122. Further, the security information storage unit 125 previously stores the identifier and PIN number of the mobile terminal 110.

The key sequence generation unit 126 receives the decrypted security key from the module control unit 121. The key sequence generation unit 126 generates a key sequence by applying a preset algorithm to the decrypted security key.

Referring to FIG. 1 again, the interface module 130 provides various types of interfaces between the mobile terminal 110 and the encryption module 120. Although a Universal Serial Bus (USB) interface which is most frequently used for the mobile terminal 110 is illustrated in the embodiment of the present invention, the present invention is not limited thereto and the interface module may be modified to various types of matching devices which can be connected to the mobile terminal 110.

Figure 4:
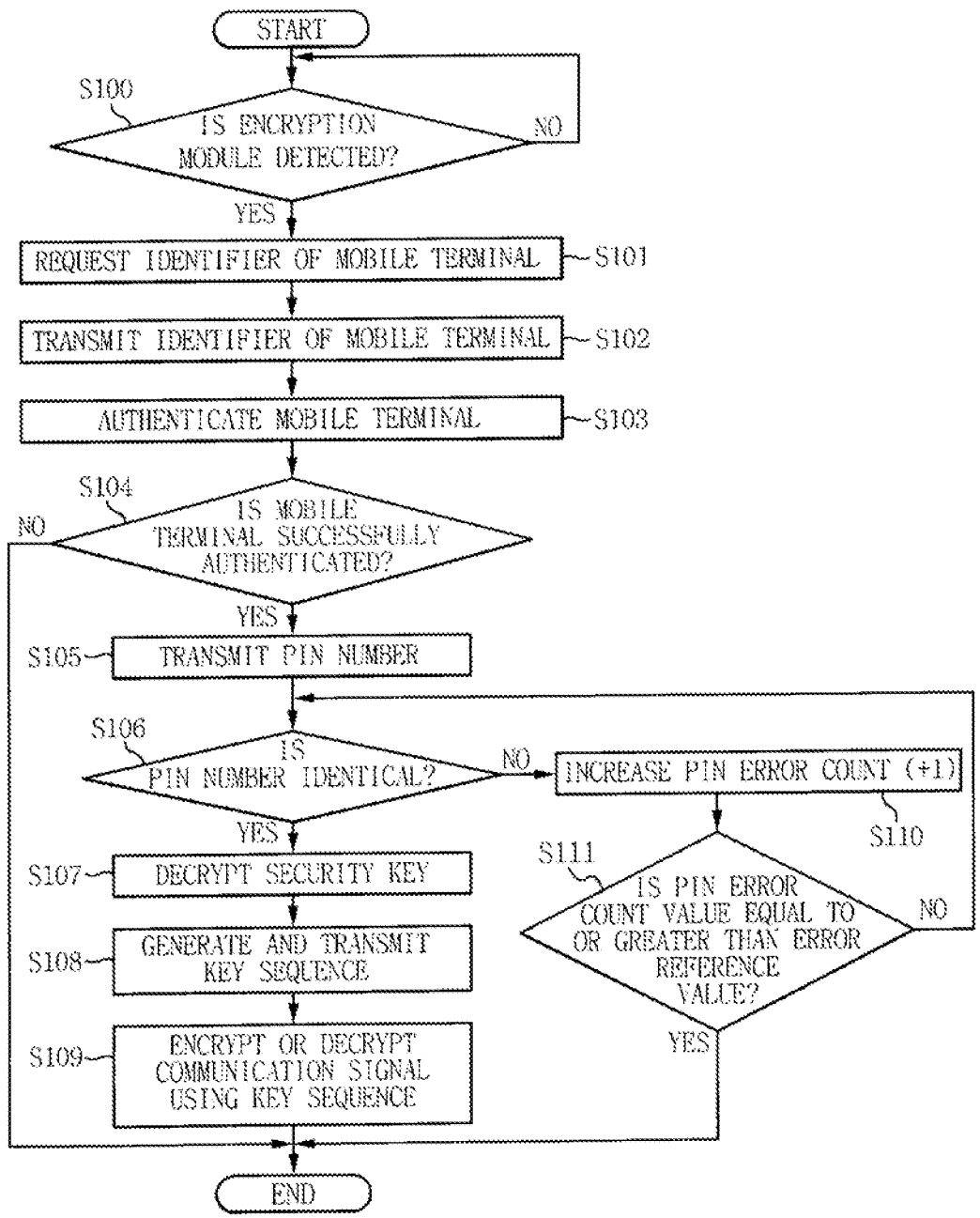
FIG. 4 is a flowchart illustrating the order of performing secure communication using the information protection system of FIG. 1.

FIG. 4 is a flowchart illustrating the order of performing the secure communication using the information protection system of FIG. 1.

As shown in FIG. 4, the mobile terminal 110 of the information protection system 100 according to the embodiment of the present invention detects whether the encryption module 120 is mounted on the mobile terminal 110 at step S100. When the encryption module 120 is mounted on the mobile terminal 110, the encryption module 120 transmits a "C_Req_Dev_ID" message used to request the identifier of the mobile terminal to the mobile terminal 110 at step S101.

The mobile terminal 110 responds to the request by transmitting a "C_Res_Dev_ID" message including the identifier of the mobile terminal to the encryption module 120 at step S102.

The encryption module 120 authenticates the corresponding mobile terminal in order to determine whether the corresponding mobile terminal is a normal terminal by applying the identifier of the mobile terminal to a Message Authentication Code (MAC) technique at steps S103 and S104.

If, as a result of the determination at step S104. the authentication of the mobile terminal is not successful, the encryption module 120 determines that the mobile terminal 110 is not a normal terminal and terminates the communication with the mobile terminal 110.

Meanwhile, if as the result of the determination at step S104, the authentication of the mobile terminal is successful, the encryption module 120 transmits a message used to provide notification that the mobile terminal has been successfully authenticated to the mobile terminal 110.

The mobile terminal 110 generates a "C_Req_Key" message, including the PIN number input by the user in order to request a key sequence. and then transmits the "C_Req_Key" message to the encryption module 120 at step S105.

The encryption module 120 detects a PIN number using the "C_Req_Key" message, and determines whether the detected PIN number is identified with the previously stored PIN number at step S106.

If, as a result of the determination at step S106, the detected PIN number is identified with the previously stored PIN number, the encryption module 120 controls the security key decryption unit 123 such that the encrypted security key is decrypted at step S107. The encryption module 120 generates the key sequence using the decrypted security key, generates a "C_Res_Key" message including the key sequence, and then transmits the "C_Res_Key" message to the mobile terminal 110 at step S108.

The mobile terminal 110 encrypts or decrypts a communication signal, that is, a voice signal or a data signal, using the key sequence received from the encryption module 120 and then performs secure communication at step S109.

Meanwhile, if as the result of the determination at step S106, the detected PIN number is not identical to the previously stored PIN number, the encryption module 120 increases the PIN number error count at step S110. The encryption module 120 determines whether the value of the PIN number error count is equal to or greater than an error reference value at step S111. It is assumed that the error reference value is "5" in the embodiment of the present invention.

If, as a result of the determination at step S111, the PIN number error count is equal to or greater than the error reference value, the encryption module 120 terminates communication with the mobile terminal 110. If, as the result of the determination at step S111, the PIN number error count is less than the error reference value, the encryption module 120 repeatedly performs the process performed after step S106.

FIG. 5 is a view illustrating the example of messages transmitted and received by the information protection system of FIG. 1 in order to perform secure communication.

Referring to FIGS. 1 and 5, "C_Req_Dev_ID" and "C_Res_Dev_ID" messages according to the embodiment of the present invention are used to request the identifier of the mobile terminal 110. That is, when the encryption module 120 requests the identifier of the mobile terminal 110, the encryption module 120 generates the "C_Req_Dev_ID" message used to request the identifier of the mobile terminal, and then transmits the "C_Req_Dev_ID" message to the mobile terminal 110. Thereafter, the mobile terminal 110 generates the "C_Res_Dev_ID" message including the identifier of the mobile terminal 110 and then transmits the "C_Res_Dev_ID" message to the encryption module 120 in response to the "C_Req_Dev_ID" message.

Next, "C_Req_Login" and "C_Req_Login" messages are used when a user logs into the encryption module 120, "C_Set_PIN" and "C_Res_PIN" messages are used to modify the setting of the PIN number. That is, when a user logs into the encryption module 120 and tries to modify the setting of the previously stored PIN number, the mobile terminal 110 first transmits the "C_Req_Login" message including the PIN number to the encryption module 120 such that the user can log into the encryption module 120 with the PIN number using the secure communication program. The encryption module 120 detects the PIN number using the "C_Req_Login" message, and transmits the "C_Res_Login" message used to provide notification that the user logged into the encryption module 120 to the mobile terminal 110 when the detected PIN number is identical to the previously stored PIN number.

After having logged in, in order to modify the setting of the PIN number which was previously stored in the encryption module 120, the mobile terminal 110 generates a "C_Set_PIN" message including a modified PIN number, transmits the generated "C_Set_PIN" message to the encryption module 120, and requests that the PIN number be changed. The encryption module 120 detects the modified PIN number by analyzing the "C_Set_PIN" message, and stores the modified PIN number in the security information storage unit 125. The encryption module 120 generates a "C_Res_PIN" message used to provide notification that the PIN number is modified, and then transmits the "C_Res_PIN" message to the mobile terminal 110.

Further, "C_Req_Key" and "C_Res_Key" messages are used to request a key sequence. That is, when the mobile terminal 110 requests a key sequence of the encryption module 120, the mobile terminal 110 generates the "C_Req_Key" message including the PIN number input by the user in order to request the key sequence, and then transmits the "C_Req_Key" message to the encryption module 120. The encryption module 120 detects the PIN number using the "C_Req_Key" message, determines whether the detected PIN number is identical to a previously stored PIN number, generates a key sequence using a decrypted security key, generates a "C_Res_Key" message including the key sequence, and then transmits the "C_Res_Key" message to the mobile terminal 110.

Meanwhile, "C_Req_Get_Info" and "C_Res_Info" messages are used to request information about the status of the encryption module 120, for example, information used to check whether the encryption module 120 is out of order. That is, the mobile terminal 110 generates the "C_Req_Get_Info" message in order to request the status of the encryption module 120, and then transmits the "C_Req_Get_Info" message to the encryption module 120. The encryption module 120 generates the "C_Res_Info" message including the status of the encryption module 120 in response to the "C_Req_Get_Info" message, and then transmits the "C_Res_Info" message to the encryption module 120.

As described above, the encryption module according to the embodiment of the present invention stores a security key encrypted using the PIN number of a user and the identifier of a mobile terminal in order to perform secure communication. When the encryption module is mounted on the mobile terminal, the encryption module generates a key sequence by decrypting an encrypted security key and then transmits the key sequence to the mobile terminal such that all the transmitted and received communication signals can be encrypted or decrypted. Therefore, the mobile terminal encrypts or decrypts all communication signals, that is, voice signals and data signals, which are transmitted and received, by applying the key sequence to the secure communication program while the internal communication module is not modified, so that wiretapping and sniffing may be prevented, thereby increasing the performance of end-to-end secure communication.

In particular, the encryption module operates while being connected to a secure communication program executed by the mobile terminal, performs only the operation of decrypting a previously encrypted and stored security key and the operation of generating a key sequence operation, and provides the resulting security key and key sequence, so that the encryption module may be simply implemented compared to a prior art scramble apparatus which performs encryption and decryption on received communication signals, thereby reducing the costs generated when the encryption module is implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An information protection system comprising:
   a mobile terminal that requests a key sequence from an encryption module by transmitting a message including a Personal Identification Number (PIN) number input by a user, and encrypts or decrypts one or more communication signals, including voice signals and data signals, based on the key sequence when the key sequence is received from the encryption module; and the encryption module that is connected to the mobile terminal, encrypts a security key using the PIN number and an identifier of the mobile terminal, decrypts the encrypted security key when requested by the mobile terminal, generates the key sequence based on the decrypted security key, transmits only the key sequence to the mobile terminal, and maintains the security key therein, wherein the encryption module determines whether to decrypt the encrypted security key by determining whether the PIN number of the message received from the mobile terminal is identical to a previously stored PIN number, and wherein, when the PIN number of the message received from the mobile terminal is not identical to the previously stored PIN number, the encryption module increases a PIN number error count, and then terminates a communication performed with the mobile terminal based on a result of comparison of the PIN number error count and an error reference value.

2. The information protection system as set forth in claim 1, wherein the encryption module receives the identifier from the mobile terminal, and authenticates the mobile terminal by applying the identifier of the mobile terminal to a Message Authentication Code (MAC) technique.

3. The information protection system as set forth in claim 1, wherein the encryption module comprises:
a security key encryption unit for performing an operation of encrypting the security key using the PIN number and the identifier of the mobile terminal when the encryption module initially accesses the mobile terminal;
a security key decryption unit for decrypting the encrypted security key when requested by the mobile terminal;
a key sequence generation unit for generating the key sequence by applying the decrypted security key to a preset algorithm;
a module control unit for encrypting the security key by controlling the security key encryption unit, and transmitting the encrypted security key to the key sequence generation unit for generating the key sequence;
a driving information storage unit for storing all programs related to a driving of the encryption module; and
a security information storage unit for storing the encrypted security key, and the PIN number and the identifier of the mobile terminal.

4. An information protection method comprising:
determining whether to connect a mobile terminal which encrypts or decrypts one or more communication signals including voice signals and data signals;
authenticating whether the mobile terminal is a normal terminal using an identifier of the mobile terminal, when the mobile terminal is connected;
determining whether a received PIN number is identical to a previously stored PIN number when the authenticated mobile terminal requests a key sequence by transmitting the PIN number input by a user;
performing an operation of decrypting a previously encrypted and stored security key when the PIN numbers are identical to each other; and
generating the key sequence based on the decrypted security key, transmitting only the key sequence to the mobile terminal such that the communication signals can be encrypted or decrypted, and maintaining the security key therein,
wherein the determining whether the received PIN number is identical to the previously stored PIN number comprises:
increasing a PIN number error count when the PIN numbers are not identical to each other; and
determining whether to terminate communication with the mobile terminal by determining whether the PIN number error count is equal to or greater than an error reference value.

5. The information protection method as set forth in claim 4, wherein the authenticating the mobile terminal comprises:
authenticating the mobile terminal by applying the identifier of the mobile terminal to a Message Authentication Code (MAC) technique;
terminating communication with the mobile terminal when the mobile terminal is not a normal terminal; and
transmitting a notification message that the mobile terminal has been successfully authenticated to the mobile terminal when the mobile terminal is a normal terminal.

6. An information protection method comprising:
executing a secure communication program in order to encrypt or decrypt one or more communication signals, including voice signals and data signals, which are transmitted and received to and from a mobile terminal;
requesting a key sequence which is applied to the secure communication program by transmitting a PIN number, input by a user, to an encryption module; and
encrypting or decrypting the communication signals by applying the key sequence to the secure communication program, when the encryption module decrypts a previously encrypted and stored security key based on a result of comparison of the received PIN number and a previously stored PIN number, and then generates and transmits only the key sequence, and maintains the security key therein,
wherein the executing the secure communication program comprises:
transmitting an identifier of the mobile terminal to the encryption module when the encryption module requests the identifier of the mobile terminal; and
receiving a notification message that the mobile terminal has been successfully authenticated from the encryption module, when the mobile terminal is a normal terminal, as a result of authentication performed by the encryption module using the identifier of the mobile terminal.

* * * * *